United States Patent [19]

Kallenberger et al.

[11] 4,259,308

[45] Mar. 31, 1981

[54] METHOD FOR PRODUCING CARBON BLACK

[75] Inventors: Robert H. Kallenberger; John E. Anderson, both of Bartlesville, Okla.

[73] Assignee: Phillips Petroleum Company, Bartlesville, Okla.

[21] Appl. No.: 19,948

[22] Filed: Mar. 12, 1979

[51] Int. Cl.³ .......................... C01B 31/02; C09C 1/48
[52] U.S. Cl. .............................. 423/449; 423/DIG. 5; 422/62; 23/230 A
[58] Field of Search ................. 423/449, 450, DIG. 5; 422/62, 150; 23/230 A

[56] References Cited

U.S. PATENT DOCUMENTS

| | | | |
|---|---|---|---|
| 3,013,785 | 12/1961 | King | 263/33 |
| 3,346,912 | 10/1967 | Fewel et al. | 18/1 |
| 3,482,327 | 12/1969 | Dutcher | 34/12 |

*Primary Examiner*—O. R. Vertiz
*Assistant Examiner*—Gregory A. Heller

[57] ABSTRACT

In a carbon black manufacturing process in which a carbon black dryer is utilized to produce a product carbon black having a specified dryness, method and apparatus is provided for controlling the flow of fuel to the carbon black dryer so as to insure that the dryness of the carbon black product will meet predetermined specifications. Feedforward, predictive control of the flow rate of the fuel to the carbon black dryer is utilized to compensate for changes in the flow rate of wet carbon black or for changes in the moisture content of the wet carbon black. In this manner, the dryness of the carbon black product is maintained at a predetermined specification even though process variations may occur.

8 Claims, 4 Drawing Figures

METHOD FOR PRODUCING CARBON BLACK

This invention relates generally to carbon black production. In a particular aspect this invention relates to method and apparatus for providing predictive, feedforward control of a carbon black dryer associated with a carbon black process so as to provide a carbon black product having a desired pellet dryness.

Carbon black as initially produced is a very fine, fluffy powder of exceedingly low density which readily scatters into the atmosphere and presents numerous difficulties in handling, shipping and storage. In order to increase its density, reduce scattering and minimize handling difficulties, it is conventional to form small pellets of the carbon black which are relatively dustless, free flowing, spheroidal pellets.

The carbon black pellets are usually produced by tumbling or otherwise agitating the carbon black with a binding agent such as water in a slowly rotating drum. The wet pellets from the rotating pelleting drum are then passed to a dryer wherein they are dried and the moisture content is generally reduced to less than about one percent and usually less than about 0.1 percent. Conventional dryers such as heated rotating drums are used to remove the moisture from the wet pellets. It is well known to those skilled in the art that the temperature of the dryer controls the ultimate quality of the dried pellets. If the temperature of the dryer is too hot, the dried pellets may be porous and have a spongy texture which offers little resistance to crumbling. In extreme cases, the drying drum may become so hot as to ignite the carbon black. On the other hand, if the dryer is too cold, the resulting pellets may be soft, crumble easily, and cake when stored. The temperature of the pellets as they are discharged from the dryer should be in the range of about 350° to about 450° F. with a range of about 375° to about 425° F. being preferred.

In conventional carbon black dryer control, the actual temperature of the carbon black pellets as they are discharged from the dryer is measured. The actual temperature is compared to a desired temperature and the result of the comparison is utilized to control the flow of fuel to the carbon black dryer so as to maintain the temperature of the pellets as they are discharged from the dryer substantially equal to the desired temperature. However, there is typically a 30 minute residence time for the carbon black in the dryer. Because of this, a process change such as the flow rate of wet carbon black or the percentage moisture in the wet carbon black will not be detected immediately but will rather be detected only when the process changes cause a change in the measured temperature of the carbon black pellets as they are discharged from the dryer. It may take as long as 30 minutes before any change can be detected in the temperature of the pellets as they are discharged from the carbon black dryer. When the change is detected, remedial action may be taken but off-specification carbon black product will be produced for a substantial length of time before the remedial action will be effective. It is thus an object of this invention to provide method and apparatus for providing predictive, feedforward control of a carbon black dryer associated with a carbon black process so as to provide a carbon black product having a desired pellet dryness even when process changes occur.

In accordance with the present invention, method and apparatus is provided whereby the flow rate of fuel to the carbon black dryer is controlled so as to maintain a desired temperature for the product carbon black flowing from the carbon black dryer. A calculated flow rate of carbon black to the carbon black mixer and a measured flow rate of water to the carbon black mixer are lagged to compensate for the residence time in the carbon black dryer. Based on the lagged flow rates, the heat required to maintain the actual temperature of the product carbon black flowing from the carbon black reactor equal to a desired temperature is calculated. This required heat is divided by the efficiency of the carbon black dryer to determine the heat that must be supplied from the furnace associated with the carbon black dryer. The calculated required heat which must be supplied by the furnace associated with the carbon black dryer is utilized to calculate the flow rate of the fuel required to produce the heat required of the furnace associated with the carbon black dryer. In this manner, product carbon black is produced having a desired temperature even though process variations may occur in the flow rate of the wet carbon black or in the percentage of water in the wet carbon black flowing to the carbon black dryer.

Other objects and advantages of the invention will be apparent from the foregoing description of the invention and the appended claims as well as from the detailed description of the drawings in which:

For the sake of simplicity, the invention is illustrated and described in terms of a single carbon black reactor having a single reaction chamber. The invention, however, is applicable to multiple carbon black reactors and is also applicable to carbon black reactors having multiple combustion chambers. The invention is also illustrated and described in terms of a carbon black dryer in which off-gas is utilized as a fuel for the furnace associated with the carbon black dryer. However, the invention is applicable to carbon black processes in which fuels other than off-gas are utilized as fuel for the furnace associated with the carbon black dryer.

The invention also illustrated and described in terms of a carbon black dryer in which air is utilized to supply oxygen to the furnace associated with the carbon black dryer. However, the invention is applicable to carbon black processes in which oxygen containing fluids other than air are utilized to supply oxygen to the furnace associated with the carbon black dryer. The invention is also illustrated and described in terms of a carbon black process in which water is used as the binding agent. The invention is, however, applicable to the use of other binding agents.

Although the invention is illustrated and described in terms of a specific carbon black reactor and a specific control configuration, the applicability of the invention described herein extends to other types of carbon black reactors and carbon black dryers and also extends to different types of control system configurations which accomplish the purpose of the present invention. Lines designated as signal lines in the drawings are electrical in this preferred embodiment. However, the invention is also applicable to pneumatic, mechanical, hydraulic, or other signal means for transmitting information. In almost all control systems some combination of these types of signals will be used. However, use of any other type of signal transmission, compatible with the process and equipment in use, is within the scope of the invention.

Both the analog and digital controllers shown may utilize the various modes of control such as proportional, proportional-integral, proportional-derivative, or proportional-integral-derivative. In this preferred embodiment, proportional-integral controllers are utilized but any controller capable of accepting two input signals and producing a scaled output signal, representative of a comparison of the two input signals, is within the scope of the invention. The operation of proportional-integral controllers is well known in the art. The output control signal of a proportional-integral controller may be represented as $$S = K_1 E + K_2 \int E dt$$

where

S = output control signals;
E = difference between two input signals; and
$K_1$ and $K_2$ = constants.

The scaling of an output signal by a controller is well known in control systems art. Essentially, the output of a controller may be scaled to represent any desired factor or variable. An example of this is where a desired pressure and an actual pressure is compared by a controller. The output could be a signal representative of a desired change in the flow rate of some gas necessary to make the desired and actual pressures equal. On the other hand, the same output signal could be scaled to represent a percentage or could be scaled to represent a temperature change required to make the desired and actual pressures equal. If the controller output can range from 0 to 10 volts, which is typical, then the output signal could be scaled so that an output signal having a voltage level of 5.0 volts corresponds to 50 percent, some specified flow rate, or some specified temperature.

The various transducing means used to measure parameters which characterize the process and the various signals generated thereby may take a variety of forms or formats. For example, the control elements of the system can be implemented utilizing electrical analog, digital electronic, pneumatic, hydraulic, mechanical or other similar types of equipment or combinations of one or more of such equipment types. While the presently preferred embodiment of the invention preferably utilizes a combination of pneumatic control elements, electrical analog signal handling and translation apparatus, and a digital computer, the apparatus and method of the invention can be implented using a variety of specific equipment available to and understood by those skilled in the process control art. Likewise, the format of the various signals can be modified substantially in order to accommodate signal format requirements of the particular installations, safety factors, the physical characteristics of the measuring or control instruments and other similar factors. For example, a raw flow measurement signal produced by a differential pressure orifice flow meter would ordinarily exhibit a generally proportional relationship to the square of the actual flow rate. Other measuring instruments might produce a signal which is proportional to the measured parameter, and still other measuring instruments may produce a signal which bears a more complicated, but known, relationship to the measured parameter. In addition, all signals could be translated into a "suppressed zero" or other similar format in order to provide a "live zero" and prevent an equipment failure from being erroneously interpreted as a low (or high) measurement or control signal. Regardless of the signal format or the exact relationship of the signal to the parameter which it represents, each signal representative of a measured process parameter or representative of a desired process value will bear a relationship to the measured parameter or desired value which permits designation of a specific measured or desired value by a specific signal value. A signal which is representative of a process measurement or desired process value is therefore one from which the information regarding the measured or desired value can be readily retrieved regardless of the exact mathematical relationship between the signal units and the measured or desired process units.

Figure 1A:
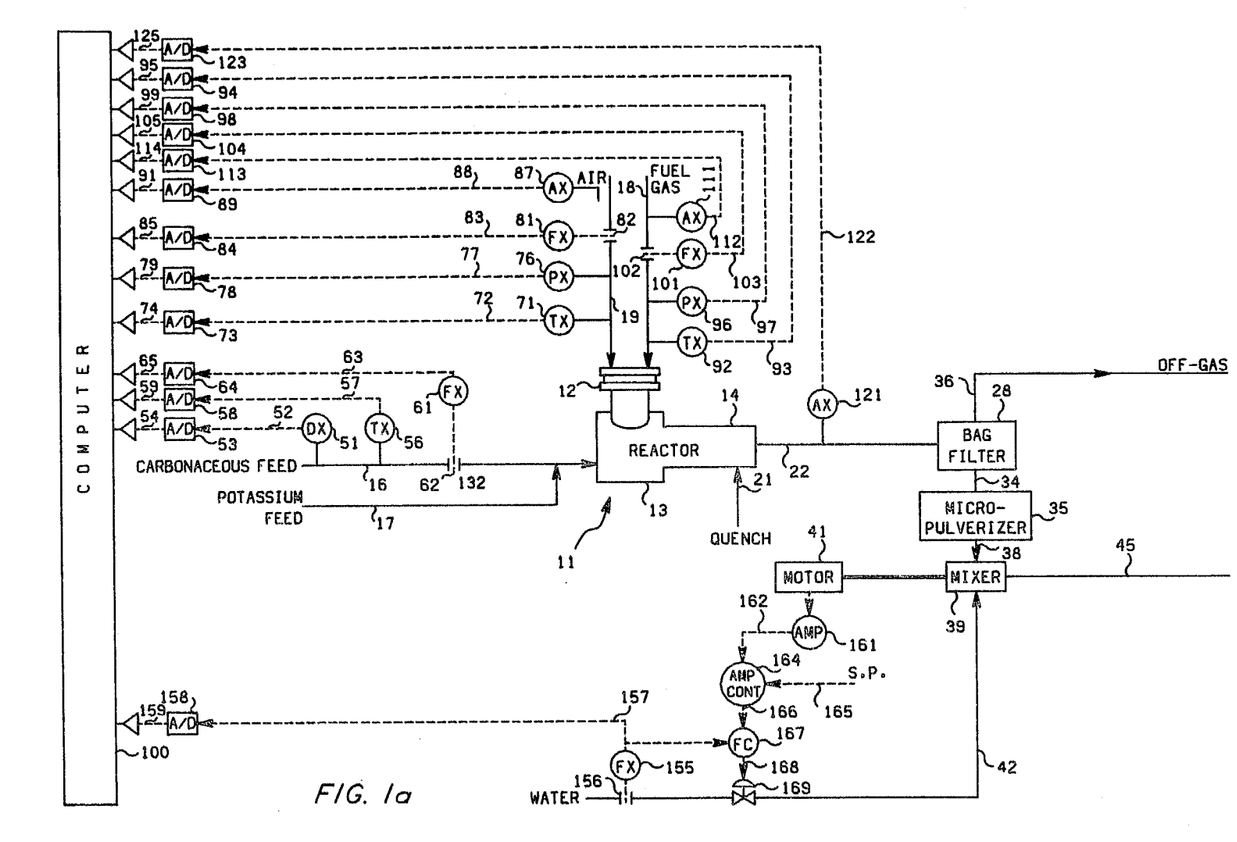
FIGS. 1a and 1b combined are a schematic representation of the apparatus used for producing carbon black in the present invention together with the associated control system for the carbon black process.
Figure 1B:
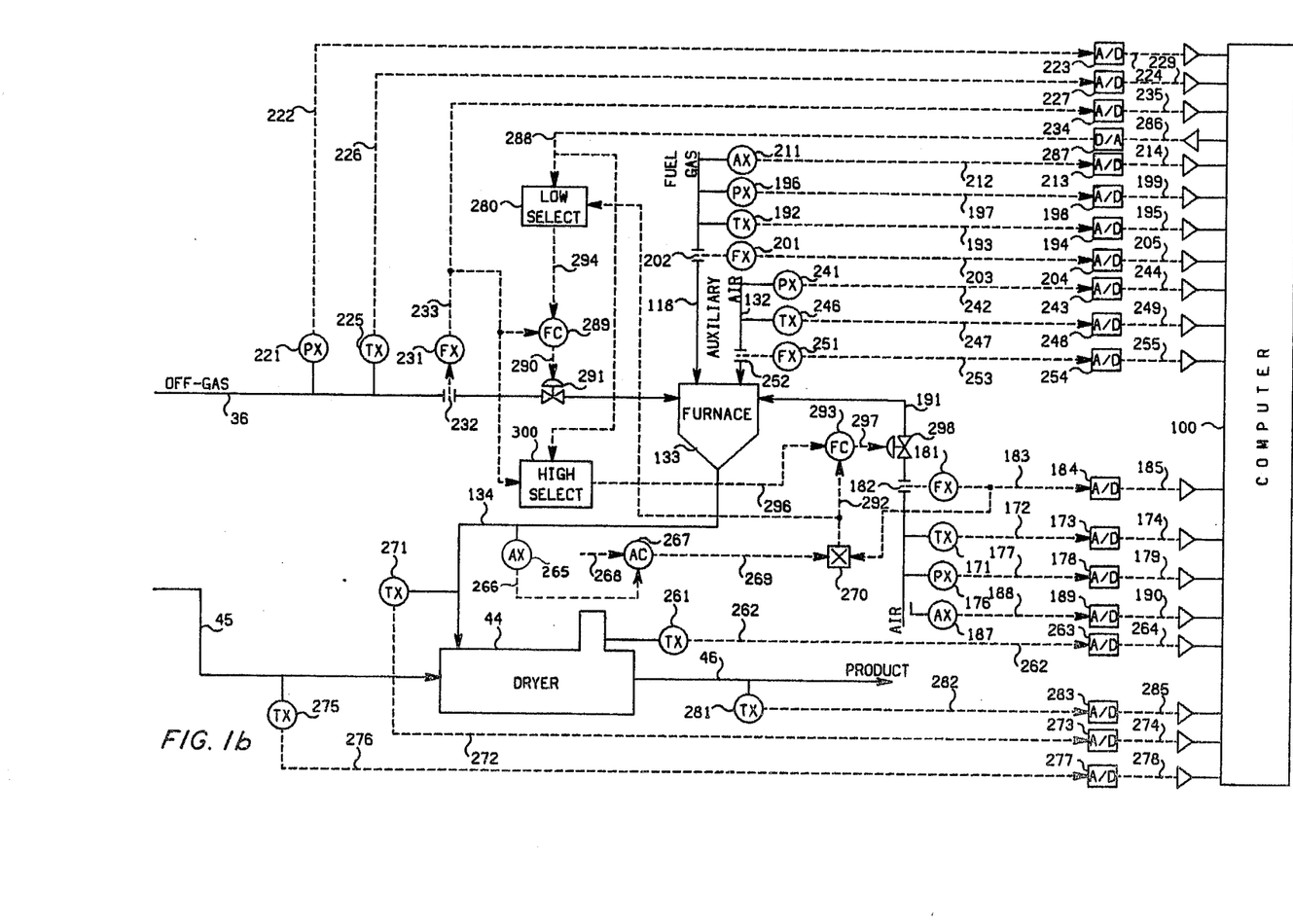

Referring now to the drawings, and in particular to FIGS. 1a and 1b as a combination, a carbon black reactor 11 having a combustion tunnel 12, combustion or precombustion chamber 13, and a reaction chamber 14 is illustrated. A carbonaceous feed is supplied to the carbon black precombustion chamber 13 through conduit means 16. A potassium containing feed such as potassium nitrate ($KNO_3$) is supplied to the carbon black precombustion chamber 13 through conduit means 17. Fuel gas is supplied to the carbon black combustion chamber 12 through conduit means 18. Air is supplied to the carbon black combustion chamber 12 through conduit means 19. The hot combustion gases produced in the carbon black combustion tunnel 12 are introduced into the carbon black precombustion chamber 13 preferably in a generally tangential manner, with respect to the carbon black reaction chamber 14, so as to effect a vortex flow of the hot combustion gases along the length of the carbon black reaction chamber 14. The hot combustion gases introduced from the carbon black combustion tunnel 12 contact the carbonaceous feed at a temperature sufficiently high to pyrolyze a substantial portion of the carbonaceous feed to carbon black particles. After a predetermined length of reaction time, depending mainly on desired photolometer, the effluent flowing through the reaction chamber 14 is quenched by contact with a quench fluid which is introduced into reaction chamber 14 through conduit means 21. Water, cool smoke or other similar fluids can be used as the quench fluid.

The effluent from the carbon black reaction chamber 14, which contains the carbon black particles and other gases, is supplied through conduit means 22 to the filter 28 which is preferably a bag filter. The filter 28 is utilized to separate the carbon black particles from the gaseous portion of the effluent flowing from the reactor 14. The separated carbon black particles are provided through conduit means 34 to the micropulverizer 35. The off-gas from the filter 28 is provided as fuel to the furnace 133 through conduit means 36.

From the micropulverizer 35 the carbon black particles are provided through conduit means 38 to the mixer 39 which is driven by the motor 41. The mixer 39 is also provided with a flow of water through conduit means 42. The carbon black particles are pelletized in the mixer 39 and are provided to the carbon black pellet driver 44 through conduit means 45. The dried carbon black is provided as product from the carbon black pellet dryer 44 through conduit means 46.

A small quantity of fuel gas is provided to the furnace 133 through conduit means 118. Also a small quantity of auxiliary air is provided to the furnace 133 through conduit means 132. The main flow of air to the furnace 133 is provided through conduit means 191. The heated effluent from the furnace 133 is provided to the carbon black dryer 44 through conduit means 134.

The carbon black process described to this point is a conventional process for manufacturing carbon black. It is the manner in which the carbon black process, illustrated in FIG. 1, is controlled so as to maintain a desired temperature for the carbon black product flowing through conduit means 46 which provides the novel features of the present invention.

The density meter 51 provides an output signal 52 which is representative of the density of the feed flowing through conduit means 16. Signal 52 is provided from the density meter 51 as an input to the analog-to-digital (A/D) converter 53. Signal 52 is converted from analog form to digital form and is provided as signal 54 to computer means 100. Computer means 100 has been divided into two sections for the sake of simplicity in illustration. Temperature transducer 56, in combination with a temperature measuring device such as a thermocouple which is operably located in conduit means 16, provides an output signal 57 which is representative of the temperature of the feed flowing through conduit means 16. Signal 57 is provided from the temperature transducer 56 as an input to the A/D converter 58. Signal 57 is converted from analog form to digital form and is provided as signal 59 to computer means 100. The flow transducer 61, in combination with the flow sensor 62, provides an output signal 63 which is representative of the flow rate of the feed flowing through conduit means 16. Signal 63 is provided from the flow transducer 61 as an input to the A/D converter 64. Signal 63 is converted from analog form to digital form and is provided as signal 65 to computer means 100.

The temperature transducer 71, in combination with a temperature measuring device such as a thermocouple which is operably located in conduit means 19, provides an output signal 72 which is representative of the temperature of the air flowing through conduit means 19. Signal 72 is provided as an input to the A/D converter 73. Signal 72 is converted from analog form to digital form and is provided as signal 74 to computer means 100. The pressure transducer 76, which is operably connected to conduit means 19, provides an output signal 77 which is representative of the pressure of the air flowing through conduit means 19. Signal 77 is provided as an input to the A/D converter 78. Signal 77 is converted from analog form to digital form and is provided signal 79 to computer means 100. The flow transducer 81, in combination with the flow sensor 82, provides an output signal 83 which is representative of the flow rate of the air flowing through conduit means 19. Signal 83 is provided as an input to the A/D converter 84. Signal 83 is converted from analog form to digital form and is provided as signal 85 to computer means 100. Analyzer transducer 87 provides an output signal 88 which is representative of the dew point of the ambient air and is thus representative of the dew point of the air flowing through conduit means 19. Signal 88 is provided as an input to the A/D converter 89. Signal 88 is converted from analog form to digital form and is provided as signal 91 to computer means 100.

Temperature transducer 92, in combination with a temperature measuring device such as a thermocouple which is operably located in conduit means 18, provides an output signal 93 which is representative of the temperature of the fuel gas flowing through conduit means 18. Signal 93 is provided as an input to the A/D converter 94. Signal 93 is converted from analog form to digital form and is provided as signal 95 to computer means 100. Pressure transducer 96, which is operably connected to conduit means 18, provides an output signal 97 which is representative of the pressure of the fuel gas flowing through conduit means 18. Signal 97 is provided as an input to the A/D converter 98. Signal 97 is converted from analog form to digital form and is provided as signal 99 to computer means 100. Flow transducer 101, in combination with the flow sensor 102, provides an output signal 103 which is representative of the flow rate of the fuel gas flowing through conduit means 18. Signal 103 is provided as an input to the A/D converter 104. Signal 103 is converted from analog form to digital form and is provided as signal 105 to computer means 100. The analyzer transducer 111, which is preferably a chromatographic analyzer, is operably connected to conduit means 18. The analyzer transducer 111 provides a plurality of output signals which are represented by signal 112. The plurality of output signals, which are represented by signal 112, are respectively representative of the concentration of nitrogen, carbon dioxide, methane, ethane, propane and butane in the fuel gas flowing through conduit means 18. The plurality of signals, which are represented by signal 112, are provided to a plurality of A/D converters which are represented by A/D converter 113. The plurality of signals, which are represented by signal 112, are converted from analog form to digital form and are provided as a plurality of signals, which are represented by signal 114, to computer means 100.

Analyzer transducer 121, which is preferably a chromatographic analyzer, is operably connected to conduit means 36. The analyzer transducer 121 provides a plurality of output signals which are represented by signal 122. The plurality of output signals, which are represented by signal 122, are respectively representative of the concentration of acetylene, hydrogen, nitrogen, carbon dioxide, carbon monoxide, and methane in the effluent flowing through conduit means 22. The plurality of signals, of which signal 122 is representative, are provided to a plurality of A/D converters of which A/D converter 123 is representative. The plurality of signals, of which signal 122 is representative, are converted from analog form to digital form and are provided as a plurality of signals represented by signal 125 to computer means 100. The analysis of the effluent flowing through conduit means 22 will be essentially the same as an analysis of the off-gas flowing through conduit means 36.

Flow transducer 155 in combination with the flow sensor 156 provides an output signal 157 which is representative of the flow rate of the water flowing through conduit means 42. Signal 157 is provided as an input to the A/D converter 158. Signal 157 is converted from analog form to digital form and is provided as signal 159 to computer means 100.

The ammeter 161 provides an output signal 162 which is representative of the electrical current being drawn by the motor 41. Signal 62 is provided as a first input to the current controller 164. The current controller 164 is also provided with a set point input 165 which is representative of the desired electrical current to be drawn by the motor 41. The current controller 164 compares signals 162 and 165 and provides an output signal 166 which is responsive to the difference between signals 162 and 165. Signal 166 is provided as a first input to the flow controller 167. Signal 166 is scaled so as to be representative of the desired flow rate of the water flowing through conduit means 42 which will provide a desired loading for the motor 41. The flow controller 167 is also provided with signal 157 which is representative of the actual flow rate of the water flowing through conduit means 42. The flow controller 167 compares signals 157 and 166 and provides an output signal 168 which is responsive to the difference between signals 157 and 166. Signal 168 is provided as an input to the pneumatic control valve 169. The pneumatic control valve 169 is manipulated in response to signal 168 so as to provide a flow rate of water through conduit means 42 which will provide a desired loading for the motor 41.

The temperature transducer 171, in combination with a temperature measuring device such as a thermocouple which is operably located in conduit means 191, provides an output signal 172 which is representative of the temperature of the air flowing through conduit means 191. Signal 172 is provided as an input to the A/D converter 173. Signal 172 is converted from analog form to digital form and is provided as signal 174 to computer means 100. The pressure transducer 176, which is operably connected to conduit means 191, provides an output signal 177 which is representative of the pressure of the air flowing through conduit means 191. Signal 177 is provided as an input to the A/D converter 178. Signal 177 is converted from analog form to digital form and is provided signal 179 to computer means 100. The flow transducer 181, in combination with the flow sensor 182, provides an output signal 183 which is representative of the flow rate of the air flowing through conduit means 191. Signal 183 is provided as an input to the A/D converter 184. Signal 183 is converted from analog form to digital form and is provided as signal 185 to computer means 100. Analyzer transducer 187 provides an output signal 188 which is representative of the dew point of the ambient air and is thus representative of the dew point of the air flowing through conduit means 191 which is the same as the dew point of the auxiliary air flowing through conduit means 203. Signal 188 is provided as an input to the A/D converter 189. Signal 188 is converted from analog form to digital form and is provided as signal 190 to computer means 100.

Temperature transducer 192, in combination with a temperature measuring device such as a thermocouple which is operably located in conduit means 118, provides an output signal 193 which is representative of the temperature of the fuel gas flowing through conduit means 118. Signal 193 is provided as an input to the A/D converter 194. Signal 193 is converted from analog form to digital form and is provided as signal 195 to computer means 100. Pressure transducer 196, which is operably connected to conduit means 118, provides an output signal 197 which is representative of the pressure of the fuel gas flowing through conduit means 118. Signal 197 is provided as an input to the A/D converter 198. Signal 197 is converted from analog form to digital form and is provided as signal 199 to computer means 100. Flow transducer 201, in combination with the flow sensor 202, provides an output signal 203 which is representative of the flow rate of the fuel gas flowing through conduit means 118. Signal 203 is provided as an input to the A/D converter 204. Signal 203 is converted from analog form to digital form and is provided as signal 205 to computer means 100. The analyzer transducer 211, which is preferably a chromatographic analyzer, is operably connected to conduit means 118. The analyzer transducer 211 provides a plurality of output signals which are represented by signal 212. The plurality of output signals, which are represented by signal 212, are respectively representative of the concentration of nitrogen, carbon dioxide, methane, ethane, propane and butane in the fuel gas flowing through conduit means 118. The plurality of signals, which are represented by signal 212, are provided to a plurality of A/D converters which are represented by A/D converter 213. The plurality of signals, which are represented by signal 212, are converted from analog form to digital form and are provided as a plurality of signals, which are represented by signal 214, to computer means 100.

Pressure transducer 221, which is operably connected to conduit means 36, provides an output signal 222 which is representative of the pressure of the off-gas flowing through conduit means 36. Signal 222 is provided as an input to the A/D converter 223. Signal 222 is converted from analog form to digital form and is provided as signal 224 to computer means 100. Temperature transducer 225, in combination with a temperature measuring device such as a thermocouple which is operably located in conduit means 36, provides an output signal 226 which is representative of the temperature of the off-gas flowing through conduit means 36. Signal 226 is provided as an input to the A/D converter 227. Signal 226 is converted from analog form to digital form and is provided as signal 229 to computer means 100. Flow transducer 231, in combination with the flow sensor 232 which is operably located in conduit means 36, provides an output signal 233 which is representative of the flow rate of the off-gas flowing through conduit means 36. Signal 233 is provided as an input to the A/D converter 234. Signal 233 is converted from analog form to digital form and is provided as signal 235 to computer means 100.

Pressure transducer 241, which is operably connected to conduit means 132, provides an output signal 242 which is representative of the pressure of the auxiliary air flowing through conduit means 132. Signal 242 is provided as an input to the A/D converter 243. Signal 242 is converted from analog form to digital form and is provided as signal 244 to computer means 100. Temperature transducer 246, in combination with a temperature measuring device such as a thermocouple which is operably located in conduit means 132, provides an output signal 247 which is representative of the temperature of the auxiliary air flowing through conduit means 132. Signal 247 is supplied as an input to the A/D converter 248. Signal 247 is converted from analog form to digital form and is provided as signal 249 to computer means 100. Flow transducer 251, in combination with the flow sensor 252 which is operably located in conduit means 132, provides an output signal 253 which is representative of the flow rate of the auxiliary air flowing through conduit means 132. Signal 253 is provided as an input to the A/D converter 254. Signal 253 is converted from analog form to digital form and is provided as signal 255 to computer means 100.

Temperature transducer 261, in combination with a temperature measuring device such as a thermocouple which is operably located in the stack of the dryer 44, provides an output signal 262 which is representative of the temperature of the effluent flowing through the stack of the dryer 44. Signal 262 is provided as an input to the A/D converter 263. Signal 262 is converted from analog form to digital form and is provided as signal 264 to computer means 100.

Temperature transducer 275, in combination with a temperature sensing device such as a thermocouple which is operably located in conduit means 45, provides an output signal 276 which is representative of the temperature of the wet carbon black flowing through conduit means 45. Signal 276 is provided as an input to the A/D converter 277. Signal 276 is converted from analog form to digital form and is provided as signal 278 to computer means 100.

Temperature transducer 281, in combination with a temperature sensing device such as a thermocouple which is operably located in conduit means 46, provides an output signal 282 which is representative of the temperature of the product carbon black flowing through conduit means 46. Signal 282 is provided as an input to the A/D converter 283. Signal 282 is converted from analog form to digital form and is provided as signal 285 to computer means 100.

In response to the described input signals, and in response to manually input signals which will be described hereinafter, the computer means 100 generates the output signal 286 which is representative of the flow rate of the off-gas required to maintain a desired temperature for the carbon black product flowing through conduit means 46. Signal 286 is utilized to control both the flow rate of the off-gas and the flow rate of the air flowing through conduit means 191 by means of an interactive analog system. Signal 286 is provided as an input to the D/A converter 287. Signal 286 is converted from digital form to analog form and is provided as an input to the low select 280 and as an input to the high select 300.

The analyzer transducer 265, which is preferably an oxygen analyzer, is operably connected to conduit means 134. The analyzer transducer 265 provides an output signal 266 which is representative of the concentration of oxygen in the effluent flowing from furnace 133. Signal 266 is provided as an input to the analyzer controller 267. The analyzer controller 267 is also provided with a set point signal 268 which is representative of the desired concentration of oxygen in the effluent flowing from furnace 133. The analyzer controller 267 compares signals 266 and 268 and provides signal 269 which is responsive to the difference between signals 266 and 268. Signal 269 is provided as an input to the multiplying block 270. The multiplying block 270 is also provided with signal 182 which is representative of the flow rate of the air flowing through conduit means 191. Signal 182 is multiplied by signal 269 to provide signal 292 which is provided as an input to the flow controller 293 and as an input to the low select 280. The lower of signals 292 and 288 is provided as signal 294 from the low select 280 to the flow controller 289. The flow controller 289 is also provided with signal 233 which is representative of the flow rate of the off-gas flowing through conduit means 36. The flow controller 289 compares signals 294 and 233 and provides signal 290 which is responsive to the difference between signals 294 and 233. Signal 290 is provided as a control signal to the pneumatic control valve 291 which is operably located in conduit means 36. The pneumatic control valve 291 is manipulated in response to signal 290 so as to maintain a desired flow rate of the off-gas flowing through conduit means 36.

The high select 300 is also provided with signal 233 which is representative of the flow rate of the off-gas flowing through conduit means 36. The higher of signals 233 and 288 is provided as signal 296 to the flow controller 293. The flow controller 293 compares signals 292 and 296 and provides a signal 297 which is responsive to the difference between signals 296 and 292. Signal 297 is provided as a control signal to the pneumatic control valve 298 which is operably located in conduit means 191. The pneumatic control valve 298 is manipulated in response to signal 297 so as to maintain a desired flow rate of air through conduit means 191. The interactive control system for the off-gas and the air insures that sufficient air will always be available to combust the off-gas flowing through conduit means 36. This is a conventional interactive control system for control of air in response to required fuel flow.

Figure 2A:
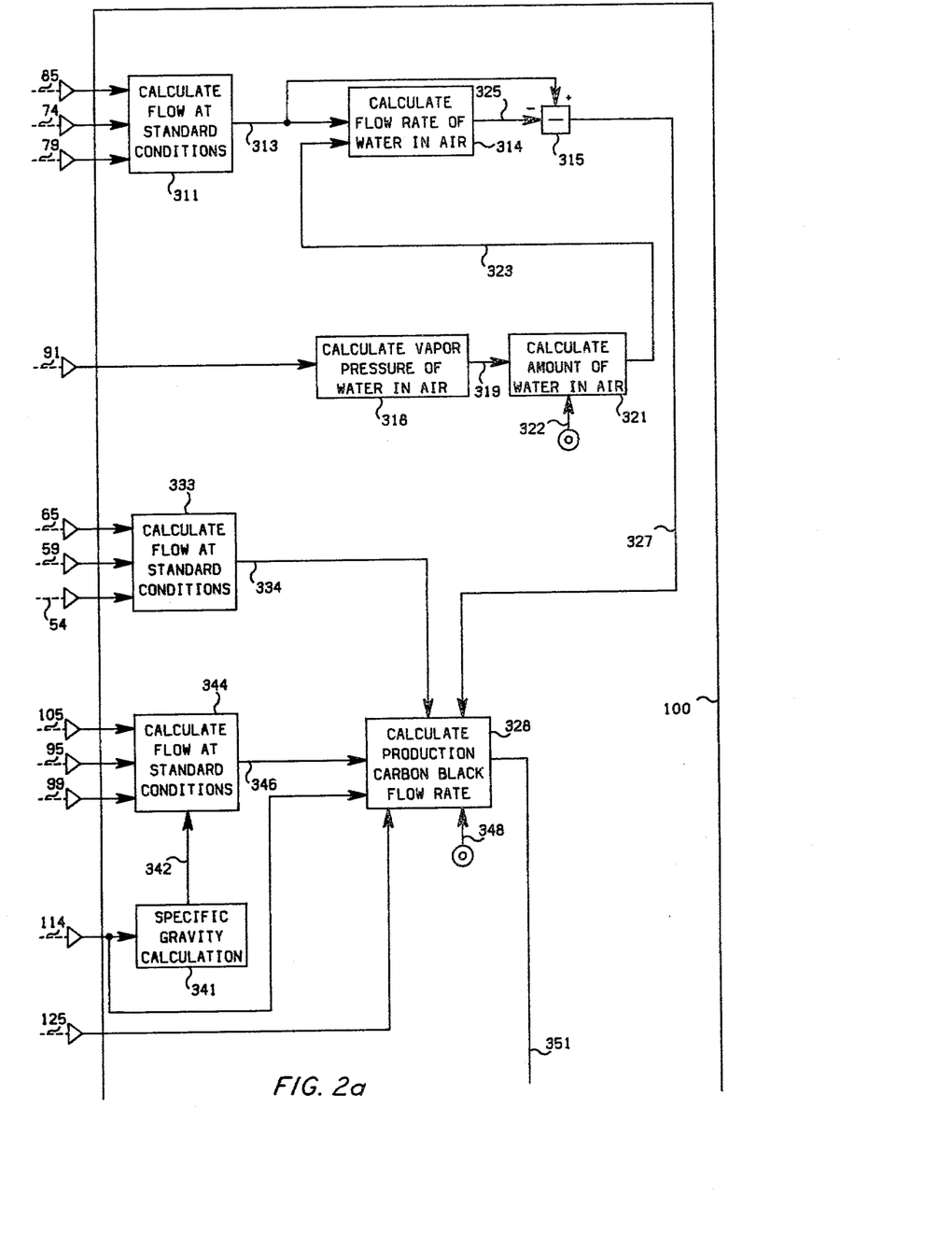
FIGS. 2a and 2b combined are a schematic representation of the computer logic utilized to process the measured data provided to the computer to provide the set point required by the control system illustrated in FIGS. 1a and 1b.
Figure 2B:
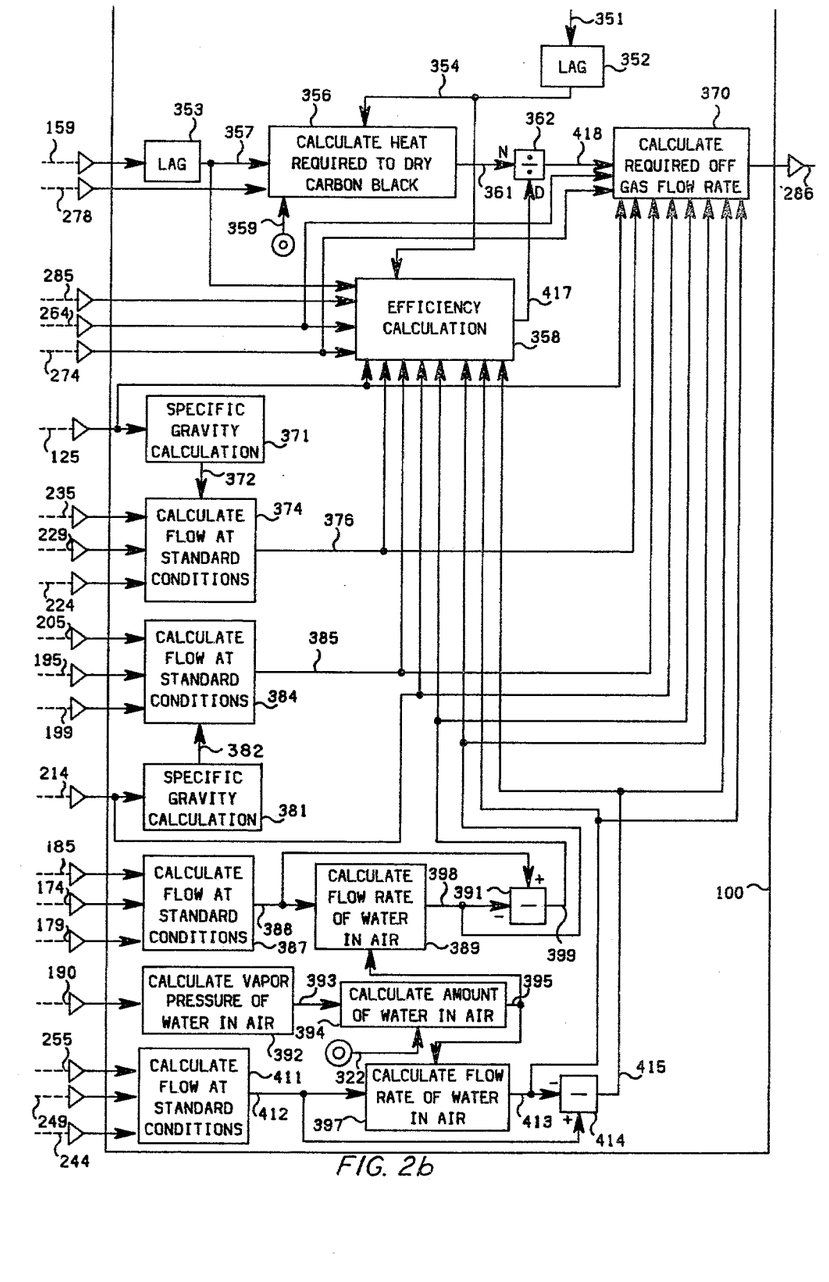

FIGS. 2a and 2b as a combination illustrate a flow diagram for the computer logic utilized to implement the control system illustrated in FIGS. 1a and 1b. As is illustrated in FIGS. 2a and 2b, signals 85, 74 and 79 which are representative of the measured flow rate, the measured pressure and the measured temperature, respectively, of the air flowing through conduit means 19 are supplied to the calculate flow at standard conditions block 311. Signals 85, 74 and 79 are utilized to calculate the flow rate of the air flowing through conduit means 19 at standard conditions utilizing equation (I):

$$F_{STD} = F_{MEAS} \left( \sqrt{\frac{T_{STD}}{T_{MEAS}}} \right) \left( \sqrt{\frac{P_{MEAS}}{P_{STD}}} \right) \quad (I)$$

where
$F_{STD}$=flow rate at standard condition;
$F_{MEAS}$=measured flow rate;
$T_{STD}$=standard temperature;
$T_{MEAS}$=measured temperature;
$P_{STD}$=standard pressure; and
$P_{MEAS}$=measured pressure.

Signal 313, which is representative of the flow rate of air flowing through conduit means 19 at standard conditions, is supplied from the calculate flow at standard conditions block 311 as an input to the calculate flow rate of water in air block 314 and as an input to the subtracting block 315.

Signal 91 which is representative of the dew point temperature of the air flowing through conduit means 19 is provided as an input to the calculate vapor pressure of water in air block 318. Signal 91 is utilized to calculate the vapor pressure of the water in the air utilizing equation (II):

$$PW = 10^{[A+(B)(T)+C/(T+D)]} \quad (II)$$

where
PW=vapor pressure of water in the air;
T=dew point temperature of the air; and
A, B, C, and D are constants. In the range of −30° to 115° F., preferred values for the contants A, B, C, and D are as follows:
A=5.3193480
B=−.00058601588
C=−2119.6319
D=301.00159

Signal 319, which is representative of the vapor pressure of the water in the air flowing through conduit means 19, is provided from the calculate vapor pressure water in air block 318 as an input to the calculate amount of water in air block 321. The calculate amount of water in air block 321 is also provided with a set point signal 322 which is representative of the barometric pressure at the carbon black manufacturing site. Signals 319 and 322 are utilized to calculate the pounds of water per pound of air in the air flowing through conduit means 19 utilizing equation (III):

$$WT = \left(\frac{PW}{PB - PW}\right)\left(\frac{18.016}{28.97}\right) \qquad (III)$$

where
 WT = pounds of water/pounds of air in the air;
 PW = vapor pressure of the water in the air; and
 PB = barometric pressure.

Signal 323, which is representative of the pounds of water per pound of air in the air flowing through conduit means 19, is provided from the calculate amount of water in air block 321 as an input to the calculate flow rate of water in air block 314. Signals 313 and 323 are utilized to calculate the flow rate of the water in the air flowing through conduit means 19 utilizing equation (IV):

$$FW = (FA)(WT) \qquad (IV)$$

where
 FW = flow rate of water in the air;
 FA = flow rate of the air containing water; and
 WT is as previously defined.

Signal 325, which is representative of the flow rate of the water in the air flowing through conduit means 19, is provided from the calculate flow rate of water in air block 314 to the subtracting block 315. Signal 325 is subtracted from signal 313 to provide signal 327 which is representative of the flow rate of dry air flowing through conduit means 19. Signal 327 is provided as an input to the calculate production carbon black flow rate block 328.

Signals 65, 59 and 54 which are respectively representative of the flow rate, temperature and density of the feed flowing through conduit means 16 are provided as inputs to the calculate flow at standard conditions block 333. Signals 65, 59 and 54 are utilized to calculate the flow rate of the feed flowing through conduit means 16 at standard conditions utilizing equation (V):

$$F_{STD} = \left(F_{MEAS}\right)\left(\sqrt{\frac{T_{STD}}{T_{MEAS}}}\right)\left(\sqrt{\frac{1}{D}}\right) \qquad (V)$$

where
 D = density of the feed flowing through conduit means 16; and
 $F_{STD}$, $F_{MEAS}$, $T_{STD}$ and $T_{MEAS}$ are as previously defined. Signal 334, which is representative of the flow rate of the feed flowing through conduit means 16 at standard conditions, is provided as an input to the calculate production carbon black flow rate block 328.

Signal 114, which is representative of the plurality of signals which are provided from the analyzer transducer 111, is provided as an input to the specific gravity calculation block 341 and as an input to the calculate production carbon black flow rate block 328. The mol percent of each constituent is multiplied by the specific gravity of each constituent and the results are summed in the specific gravity calculation block 341 to provide signal 342 which is representative of the specific gravity of the fuel gas flowing through conduit means 18. Equation (VI) is utilized in the specific gravity calculation to provide signal 342:

$$SG_F = \sum_{i=\text{nitrogen}}^{\text{butane}} \text{mol } \%_i * SG_i \qquad (VI)$$

where
 $SG_F$ = specific gravity of the fuel gas flowing through conduit means 18;
 mol $\%_i$ = mol % of a specific component in the fuel gas stream;
 $SG_i$ = specific gravity of a specific component in the fuel gas flowing through conduit means 18; and
 i = the particular constituent in the fuel gas (nitrogen, carbon dioxide, methane, ethane, propane, and butane).

Signal 342 is provided from the specific gravity calculation block 341 as an input to the calculate flow at standard conditions block 344.

Signals 105, 95 and 99 which are respectively representative of the flow rate, temperature, and pressure of the fuel gas flowing through conduit means 18 are provided as inputs to the calculate flow at standard conditions block 344. Signals 105, 95, 99 and 342 are utilized to calculate the flow rate of the fuel gas flowing through conduit means 18 at standard conditions utilizing equation (VII):

$$F_{STD} = \left(F_{MEAS}\right)\left(\sqrt{\frac{T_{STD}}{T_{MEAS}}}\right)\left(\sqrt{\frac{P_{MEAS}}{P_{STD}}}\right)\left(\sqrt{\frac{1}{SG_F}}\right) \qquad (VII)$$

where
 $F_{STD}$, $F_{MEAS}$, $T_{STD}$, $T_{MEAS}$, $P_{MEAS}$, $P_{STD}$ and $SG_F$ are as previously defined.

Signal 346, which is representative of the flow rate of the fuel gas flowing through conduit means 18 at standard conditions, is provided as an input to the calculate production carbon black flow rate block 328.

Signal 125, which is representative of the plurality of outputs which are provided from the analyzer transducer 121, is provided as an input to the calculate production carbon black flow rate 328. The calculate production carbon black flow rate block 328 is also provided with set point signal 348. Signal 348 is representative of the percentage of carbon in the feed flowing through conduit means 16. Signal 348 is derived from a laboratory analysis of the feed flowing through conduit means 16. The latest laboratory analysis available for the feed flowing through conduit means 16 is utilized for the set point signal 348.

All of the flow rates into the carbon black reactor in combination with the analysis of the carbon containing flows to the carbon black reactor are utilized in a material balance to produce signal 351 which is representative of the flow rate of carbon black out of the reactor 11. As has been previously stated, this flow rate cannot be measured and it is thus necessary to utilize a material balance to derive the flow rate of the carbon black.

Specifically, the flow rate of carbon containing materials other than carbon black flowing out of the reactor 11 is subtracted from the flow rate of carbon into the reactor 11 to produce signal 351 which is representative of the flow rate of the production carbon black out of the reactor 11. Signal 351 is provided from the calculate production carbon black flow rate block 328 to the lag block 352.

The two lag blocks 252 and 253, illustrated in FIGS. 2a and 2b, are provided to account for the time delay required for the propagation of the wet carbon black through the dryer 44. The output signals from the lag blocks will thus be representative of a flow rate of the wet carbon black delayed by the actions of one or several time constants and/or dead times as required for the dryer 44. The propagation delay through the dryer 44 is known at least to the extent that the propagation delay can be estimated with reasonable accuracy. The propagation delay can also be calculated based on the physical dimensions of the dryer. Signal 354, which is provided as an output from the lag block 352, is thus representative of the flow rate of the carbon black flowing out of the reactor 14 delayed by the time required for the carbon black to pass through the dryer 44. Signal 354 is provided as an input to the calculate heat required to dry carbon black block 356 and also as an input to the efficiency calculation block 358.

Signal 159, which is representative of the flow rate of the water flowing to the mixer 39, is provided as an input to the lag block 353. The output signal 357 from the lag block 353 will be representative of the flow rate of the water flowing to the mixer 39 delayed by the time required for the wet carbon black to pass through the dryer 44. Signal 357 is provided as an input to the calculate heat required to dry carbon black block 356. The calculate heat required to dry carbon black block 356 is also provided with signal 278 which is representative of the temperature of the wet carbon black entering the carbon black dryer 44 and with a set point signal 359 which is representative of the desired temperature of the carbon black product flowing from the carbon black dryer 44 through conduit means 46.

The heat required to dry the carbon black is calculated in block 356 by first calculating the enthalpy of the carbon black at the set point temperature for the carbon black product. The enthalpy of the carbon black as the carbon black enters the dryer 44 is then calculated. The difference between the enthalpy of the carbon black at the set point temperature and the enthalpy of the carbon black as the carbon black enters the dryer 44 is the heat required to raise the carbon black temperature to the desired set point temperature. This required heat for the carbon black is then multiplied by signal 354 to provide the heat required per unit time to raise the temperature of the carbon black entering the carbon black dryer to the desired temperature of the carbon black product. The enthalpy of the water at the set point temperature is then calculated. The enthalpy of the water as the water enters the dryer 44 is also calculated. The difference between the enthalpy of the water at the set point temperature and the enthalpy of the water as the water enters the carbon black dryer 44 is the heat required to raise the water temperature to the set point temperature. This required heat for the water is then multiplied by signal 358 to provide the heat required per unit time to raise the temperature of the water entering the carbon black dryer to the desired temperature of the carbon black product. The summation of the heat required per unit time to raise the temperature of the water and carbon black from entrance temperature to set point temperature is provided as the output signal 361 from the calculate heat required to dry carbon black block 356. Signal 361 is provided as an input to the dividing block 362.

The enthalpy is calculated using an equation of the following type:

$$H = a + bT - cT^2 + dT^3 \qquad (VIII)$$

where
H = enthalpy;
T = temperature; and
a, b, c and d = constants. The value of the constants a, b, c and d is obtained by curve fitting enthalpy data available in many data books such as *Data Book on Hydrocarbons* by J. B. Maxwell, D. Van Nostrand Co., Inc., 1950. The temperature T is either the actual temperature of the wet carbon black or the desired temperature of the dried carbon black depending on which enthalpy is being calculated.

Signal 125, which is representative of the plurality of signals which are provided from the analyzer transducer 121, is provided as an input to the specific gravity calculation block 371, as an input to the efficiency calculation block 358 and as an input to the calculate required off-gas flow rate block 370. The mol percent of each constituent in the off-gas is multiplied by the specific gravity of each constituent and the results are summed in the specific gravity calculation block 371 to provide signal 372 which is representative of the specific gravity of the off-gas flowing through conduit means 36. Equation (IX) is utilized in the specific gravity calculation to provide signal 372:

$$SG_{OG} = \sum_{i=\text{acetylene}}^{\text{methane}} \text{mol } \%_i * SG_i \qquad (IX)$$

where
$SG_{OG}$ = specific gravity of the off-gas flowing through conduit means 36;
Mol $\%_i$ = mol % of a specific component in the off-gas;
$SG_i$ = specific gravity of a specific component in the off-gas; and
i is the particular constituent in the off-gas (acetylene, hydrogen, nitrogen, carbon dioxide, carbon monoxide and methane). Signal 372 is provided from the specific gravity calculation block 371 as an input to the calculate flow at standard conditions block 374.

Signals 235, 229 and 224 which are respectively representative of the flow rate, temperature and pressure of the off-gas flowing through conduit means 36 are provided as inputs to the calculate flow at standard conditions block 374. Signals 235, 229, 224 and 372 are utilized to calculate the flow rate of the off-gas flowing through conduit means 36 at standard conditions utilizing equation (VII). Signal 376 which is representative of the flow rate of the off-gas flowing through conduit means 36 at standard conditions is provided as an input to the efficiency calculation block 358 and as an input to the calculate required off-gas flow rate block 370.

Signal 214, which is representative of the plurality of signals which are provided from the analyzer transducer 211, is provided as an input to the specific gravity calculation block 381, as an input to the efficiency calculation block 358 and as an input to the calculate required off-gas flow rate block 370. The mol percent of each constituent in the fuel gas flowing through conduit means 118 is multiplied by the specific gravity of each constituent and the results are summed in the specific gravity calculation block 381 to provide signal 382 which is representative of the specific gravity of the fuel gas flowing through conduit means 118. Equation (VI) is utilized in the specific gravity calculation to provide signal 382. Signal 382 is provided from the specific gravity calculation block 381 to the calculate flow at standard conditions block 384. Signals 205, 195 and 199, which are respectively representive of the flow rate, temperature and pressure of the fuel gas flowing through conduit means 118 are also provided as inputs to the calculate flow at standard conditions block 384. Signals 205, 195, 199 and 382 are utilized to calculate the flow rate of the fuel gas flowing through conduit means 118 at standard conditions utilizing equation (VII). Signal 385, which is representative of the flow rate of the fuel gas flowing through conduit means 118 at standard conditions, is provided as an input to the efficiency calculation block 358 and as an input to the calculate required off-gas flow rate block 370.

Signals 185, 174 and 179, which are respectively representative of the flow rate, temperature and pressure of the air flowing through conduit means 191, are provided as inputs to the calculate flow at standard conditions block 387. Signals 185, 174 and 179 are utilized to calculate the flow rate of the air flowing through conduit means 191 at standard conditions utilizing equation (I). Signal 388, which is representative of the flow rate of the air flowing through conduit means 191 at standard conditions, is supplied from the calculate flow at standard conditions block 387 as an input to the calculate flow rate of water in air block 389 and as an input to the subtracting block 391.

Signal 190 which is representative of the dew point temperature of the air flowing through conduit means 191 and the air flowing through conduit means 132 is provided as an input to the calculate vapor pressure of water in air block 392. Signal 190 is utilized to calculate the vapor pressure of the water in the air utilizing equation (II). Signal 393, which is representative of the vapor pressure of the water in the air flowing through conduit means 191 and 132, is provided from the calculate vapor pressure of water in air block 392 to the calculate amount of water in air block 394. The calculate amount of water in air block 394 is also supplied by signal 322 which is representative of the barometric pressure at the carbon black processing site. Signals 393 and 322 are utilized to calculate the pounds of water/pound of air in the air flowing through conduit means 191 and 132 utilizing equation (III). Signal 395, which is representative of the pounds of water/pound of air in the air flowing through conduit means 191 and 132, is provided from the calculate amount of water in air block 394 as an input to the calculate flow rate of water in air block 389 and as an input to the calculate flow rate of water in air block 397.

Signals 388 and 395 are utilized to calculate the flow rate of the water in the air flowing through conduit means 191 utilizing equation (IV). Signal 398, which is representative of the flow rate of the water in the air flowing through conduit means 191, is provided from the calculate flow rate of water in air block 389 as an input to the subtracting block 391, an input to the efficiency calculation block 358 and as an input to the calculate required off-gas flow rate block 370. Signal 398 is subtracted from signal 388 to provide signal 399 which is representative of the flow rate of dry air flowing through conduit means 191. Signal 399 is provided as an input to the efficiency calculation block 358 and as an input to the calculate required off-gas flow rate block 370.

Signals 255, 249 and 244, which are respectively representative of the flow rate, temperature and pressure of the auxiliary air flowing through conduit means 132, are provided as inputs to the calculate flow at standard conditions block 411. Signals 255, 249 and 244 are utilized to calculate the flow rate of the auxiliary air flowing through conduit means 132 at standard conditions utilizing equation (I). Signal 412, which is representative of the flow rate of the air flowing through conduit means 132 at standard conditions, is supplied as an input to the calculate flow rate of water in air block 397.

Signals 395 and 412 are utilized to calculate the flow rate of the water in the air flowing through conduit means 132 utilizing equation (IV). Signal 413, which is representative of the flow rate of the water in the air flowing through conduit means 132, is provided from the calculate flow rate of water in air block 397 as an input to the subtracting block 414, an input to the efficiency calculation block 358 and as an input to the calculate required off-gas flow rate block 370.

Signal 413 is subtracted from signal 412 to provide signal 415 which is representative of the flow rate of dry air flowing through conduit means 132. Signal 415 is provided as an input to the efficiency calculation block 358 and as an input to the calculate required off-gas flow rate block 370.

The efficiency calculation block 358 is also provided with signals 285, 264 and 274. Signal 285 is representative of the temperature of the product flowing out of the dryer 44. Signal 264 is representative of the stack temperature of the dryer 44. Signal 274 is representative of the temperature of the effluent flowing from the furnace 133. Signals 264 and 274 are also supplied as inputs to the calculate required off-gas flow rate block 370.

Based on the described inputs, the efficiency of the carbon black dryer 44 is calculated in the efficiency calculation block 358. The numerator of the calculation is the heat required to dry the carbon black to the product temperature. This calculation is the same as the previously described calculation utilized in block 356 except that the actual product temperature is used instead of the set point temperature for the carbon black product. The denominator for the efficiency calculation is calculated by first determining the mass flows and analysis of the off-gas, fuel and air to determine the quantity of the various combustion components ($CO_2$, $H_2O$, $N_2$, $O_2$). The enthalpies of each component at the furnace outlet temperature and at the dryer stack temperature are then calculated. The difference between the summations of enthalpies at the furnace outlet and the dryer stack is the denominator of the efficiency calculation. The output signal 417 from the efficiency calculation block 358 is thus the ratio of the theoretical heat required to the actual heat lost in drying the carbon block in the carbon black dryer 44. Signal 417 is provided as an input to the dividing block 362. Signal 361 is divided by signal 417 to provide signal 418 which is representative of the actual heat required from the furnace 133. Signal 418 is provided as an input to the calculate required off-gas flow rate block 370.

Based on the described inputs, the off-gas flow rate required is calculated in block 370. The mass flows of fuel gas and auxiliary air and the analysis of the fuel gas are used to determine the quantities of the various combustion components ($CO_2$, $H_2O$, $N_2$, $O_2$) in the fuel gas and the auxiliary air. The furnace outlet temperature and dryer stack temperature are utilized in enthalpy equations of the form of equation (VIII) to determine the heat given up by the fuel gas and the auxiliary air in the carbon black dryer 44. Since the fuel gas flow and the auxiliary air flow are not manipulated in the present invention, the heat (BTUs) given up by the fuel gas and the auxiliary air can be subtracted from the heat required of the furnace 133 which is represented by signal 418.

The actual off-gas flow rate is divided by the actual air flow rate to obtain an off-gas/air ratio. This ratio and the off-gas analysis is used to calculate the components of combustion contained in a unit of off-gas. The furnace outlet temperature and the dryer stack temperature are utilized in enthalpy equations similar to equation (VIII) to determine the heat per unit (BTU/lb) of the off-gas that is given up in the carbon black dryer 44. This heat per unit of off-gas is divided into the required heat to obtain the flow rate of the off-gas required to dry the carbon black to the set point temperature. Signal 286, which is representative of the required flow rate of the off-gas, is provided as an output signal from computer means 100 and is utilized as has been previously described.

The invention has been described in terms of a preferred embodiment as is illustrated in FIGS. 1a, 1b, 2a and 2b. Specific components which can be utilized in the practice of the invention as illustrated in FIGS. 1a and 1b such as temperature transducers 56, 71, 92, 225, 192, 246, 171, 261, 281 and 271; flow transducers 61, 81, 101, 155, 231, 201, 251 and 181; flow sensors 62, 82, 102, 156, 232, 202, 252 and 182; pressure transducers 76, 96, 221, 196, 241 and 176; flow controllers 167, 289 and 293; pneumatic control valves 169, 291 and 298; amperage controller 164; ammeter 161; and analyzer controller 267 are each well known commercially available control components such as are described at length in Perry's *Chemical Engineers Handbook*, 4th Edition, Chapter 22, McGraw-Hill.

Other components illustrated in FIG. 1 are as follows:

| | |
|---|---|
| Analyzer transducers 121, 111 and 211 | Optichrom 2100, Applied Automation, Inc. |
| Density meter 51 | Dynatrol Density Meter, Automation Product, Inc. |
| Dew point analyzers 87 and 187 | Honeywell Dew Probe Model No. SSP. 129B021, Honeywell |
| Multiplying means 270 | B05885 Multi-use Amp, Applied Automation, Inc. |
| Low select 280 | B04719 Limit Select, Applied Automation, Inc. |
| High select 300 | B04719 Limit Select, Applied Automation, Inc. |
| Computer means 100 | Optrol 3600, Applied Automation, Inc. |

Also, for reasons of brevity and clarity, conventional auxiliary equipment such as pumps for feed and fuel gases, additional heat exchangers, additional measurement-control devices, and additional process equipment required in carbon black production have not been included in the above description as they play no part in the explanation of the invention.

While the invention has been described in terms of the presently preferred embodiment, reasonable variations and modifications are possible, by those skilled in the art, within the scope of the described invention and appended claims. For example, the basic control illustrated in FIGS. 1a, 1b, 2a and 2b may frequently be used as a sub-system for a more comprehensive carbon black control. Also a fuel other than the off-gas from the carbon black separator could be utilized to supply the fuel requirements of the furnace if desired.

That which is claimed is:

1. A method for manipulating the heat supplied from a furnace to a carbon black dryer so as to produce a dried carbon black product at a desired temperature comprising the steps of:

establishing a first signal representative of the heat required per unit time to maintain said dried carbon black product at a desired temperature;

establishing a second signal representative of the efficiency of said carbon black dryer;

responsive to said first signal and said second signal, establishing a third signal representative of the heat which must be supplied per unit time from said furnace to said carbon black dryer to produce said dried carbon black product at the desired temperature;

establishing a fourth signal representative of the heat, per unit of the fuel supplied to said furnace, which is given up in said carbon black dryer;

responsive to said third signal and said fourth signal, establishing a fifth signal representative of the flow rate of said fuel to said furnace required to produce said dried carbon black product at the desired temperature; and manipulating the flow rate of said fuel in response to said fifth signal.

2. A method in accordance with claim 1 additionally comprising the steps of:

supplying oxygen to said furnace; and manipulating the flow rate of said oxygen in response to said fifth signal.

3. A method in accordance with claim 2 additionally comprising the steps of:

supplying a carbonaceous feed to a carbon black reaction zone to therein convert said carbonaceous feed to carbon black and gas;

separating said carbon black from said gas;

supplying at least a portion of said gas which has been separated from said carbon black as fuel to said furnace;

supplying said carbon black to a mixer;

supplying a liquid binder to said mixer; and supplying wet carbon black from said mixer means to said carbon black dryer.

4. A method in accordance with claim 11 wherein said step of establishing said first signal comprises:

establishing a sixth signal representative of the flow rate of said carbon black from said carbon black reaction zone;

delaying said sixth signal to thereby establish a seventh signal which is representative of the flow rate of the carbon black from said carbon black reaction zone delayed by the residence time of the carbon black in said carbon black dryer;

establishing an eighth signal representative of the flow rate of said liquid binder to said mixer;

delaying said eighth signal to thereby establish a ninth signal representative of the flow rate of said liquid binder to said mixer delayed by the residence time of said carbon black in said carbon black dryer;

establishing a tenth signal representative of the temperature of said wet carbon black entering said carbon black dryer;

establishing an eleventh signal representative of said desired temperature of said dried carbon black product;

responsive to said tenth signal, establishing a twelfth signal representative of the enthalpy of said carbon black entering said carbon black dryer;

responsive to said eleventh signal, establishing a thirteenth signal representative of the enthalpy of the carbon black entering said carbon black dryer means at said desired temperature of said dried carbon black product;

comparing said twelfth signal and said thirteenth signal and establishing a fourteenth signal responsive to the difference between said twelfth signal and said thirteenth signal, said fourteenth signal being representative of the heat required to raise the temperature of the carbon black entering said carbon black dryer to the desired temperature of said dried carbon black product leaving said carbon black dryer;

multiplying said seventh signal and said fourteenth signal to thereby establish a fifteenth signal representative of the heat required per unit time to raise the temperature of the carbon black entering said carbon black dryer to said desired temperature of said dried carbon black product;

responsive to said tenth signal, establishing a sixteenth signal representative of the enthalpy of the liquid binder in said wet carbon black entering said carbon black dryer;

responsive to said eleventh signal, establishing a seventeenth signal representative to the enthalpy of the liquid buffer in said wet carbon black entering said carbon black dryer at said desired temperature of said dried carbon black product;

comparing said sixteenth signal and said seventeenth signal and establishing an eighteenth signal responsive to the difference between said sixteenth signal and said seventeenth signal;

multiplying said ninth signal and said eighteenth signal to thereby establish a nineteenth signal representative of the heat per unit time required to raise the temperature of the liquid binder in said wet carbon black entering said carbon black dryer to said desired temperature of said dried carbon black product; and combining said fifteenth signal and said nineteenth signal to thereby establish said first signal.

5. A method in accordance with claim 3 wherein said step of establishing said second signal comprises:

establishing a sixth signal representative of the flow rate of said carbon black from said carbon black reaction zone;

delaying said sixth signal to thereby establish a seventh signal which is representative of the flow rate of said carbon black from said carbon black reaction zone delayed by the residence time of the carbon black in said carbon black dryer;

establishing an eighth signal representative of the flow rate of said liquid binder to said mixer;

delaying said eighth signal to thereby establish a ninth signal representative of the flow rate of said liquid binder to said mixer delayed by the residence time of the carbon black in said carbon black dryer;

establishing a tenth signal representative of the temperature of said wet carbon black entering said carbon black dryer;

establishing an eleventh signal representative of the actual temperature of said dried carbon black product;

responsive to said tenth signal, establishing a twelfth signal representative of the enthalpy of the carbon black entering said carbon black dryer;

responsive to said eleventh signal, establishing a thirteenth signal representative of the enthalpy of the carbon black entering said carbon black dryer at the actual temperature of said dried carbon black product;

comparing said twelfth signal and said thirteenth signal and establishing a fourteenth signal responsive to the difference between said twelfth signal and said thirteenth signal, said fourteenth signal being representative of the heat required to raise the temperature of the carbon black entering said carbon black dryer to the actual temperature of said dried carbon black product leaving said carbon black dryer;

multiplying said seventh signal by said fourteenth signal to thereby establish a fifteenth signal representative of the heat required per unit time to raise the temperature of the carbon black entering said carbon black dryer to the actual temperature of said dried carbon black product;

responsive to said tenth signal, establishing a sixteenth signal representative of the enthalpy of the liquid binder in said wet carbon black entering said carbon black dryer;

responsive to said eleventh signal, establishing a seventeenth signal representative of the enthalpy of the liquid binder in said wet carbon black entering said carbon black dryer at the actual temperature of said dried carbon black product;

comparing said sixteenth signal and said seventeenth signal and establishing an eighteenth signal responsive to the difference between said sixteenth signal and said seventeenth signal;

multiplying said ninth signal by said eighteenth signal to thereby establish a nineteenth signal representative of the heat per unit time required to raise the temperature of the liquid binder in said wet carbon black entering said carbon black dryer to the actual temperature of said dried carbon black product;

combining said fifteenth signal and said nineteenth signal to thereby establish a twentieth signal representative of the theoretical heat required to raise the temperature of said wet carbon black to the actual temperature of said dried carbon black;

establishing a twenty-first signal representative of the enthalpy of the combustion components of said fuel at the outlet of said furnace;

establishing a twenty-second signal representative of the enthalpy of said combustion components of said fuel at the stack associated with said carbon black dryer;

subtracting said twenty-second signal from said twenty-first signal to thereby establish a twenty-third signal representative of the actual heat lost in the drying of the carbon black in said carbon black dryer; and dividing said twentieth signal by said twenty-third signal to establish said second signal.

6. A method in accordance with claim 3 wherein said step of establishing said third signal comprises dividing said first signal by said second signal.

7. A method in accordance with claim 3 wherein said step of establishing said fourth signal comprises:

establishing a sixth signal representative of the flow rate of said fuel;

establishing a seventh signal representative of the flow rate of oxygen required to support the combustion of said fuel;

establishing an eighth signal representative of the temperature of the combustion components at the outlet of said furnace;

establishing a ninth signal representative of the temperature of the combustion components flowing out of the stack associated with said carbon black dryer;

responsive to said sixth signal, said seventh signal and said eighth signal, establishing a tenth signal representative of the enthalpy of said combustion components at the outlet of said furnace;

responsive to said sixth signal, said seventh signal and said ninth signal, establishing an eleventh signal representative of the enthalpy of said combustion components at the stack associated with said carbon black dryer;

substracting said eleventh signal from said tenth signal to thereby establish said fourth signal.

8. A method in accordance with claim 3 wherein said step of establishing said fifth signal comprises dividing said third signal by said fourth signal.

* * * * *

UNITED STATES PATENT AND TRADEMARK OFFICE
CERTIFICATE OF CORRECTION

PATENT NO. : 4,259,308
DATED : March 31, 1981
INVENTOR(S) : Robert H. Kallenberger et al It is certified that error appears in the above-identified patent and that said Letters Patent are hereby corrected as shown below:

Column 18, claim 4, line 59, after "claim", delete "11" and insert --- 3 ---.

Column 19, claim 4, line 43, after "liquid", delete "buffer" and insert --- binder ---.

Signed and Sealed this

Twenty-ninth Day of September 1981

[SEAL]

Attest:

GERALD J. MOSSINGHOFF

Attesting Officer     Commissioner of Patents and Trademarks